United States Patent
Xu

(10) Patent No.: US 7,455,050 B2
(45) Date of Patent: Nov. 25, 2008

(54) O-RING RETAINER FOR A FUEL INJECTOR IN A FUEL RAIL SOCKET

(75) Inventor: Wenbin Xu, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 167 days.

(21) Appl. No.: 11/638,594

(22) Filed: Dec. 13, 2006

(65) Prior Publication Data

US 2008/0141978 A1      Jun. 19, 2008

(51) Int. Cl.
*F02M 55/02*     (2006.01)
*F02M 61/14*     (2006.01)

(52) U.S. Cl. .................... 123/468; 123/470

(58) Field of Classification Search ........ 123/468, 123/469, 470
See application file for complete search history.

(56) References Cited

U.S. PATENT DOCUMENTS

| | | | | |
|---|---|---|---|---|
| 2,398,555 A * | 4/1946 | Parker ................ | 285/334.5 |
| 2,427,260 A * | 9/1947 | Cowles ............... | 285/334.5 |
| 2,826,437 A * | 3/1958 | Detweiler et al. ...... | 285/233 |
| 3,669,472 A * | 6/1972 | Nadsady ............. | 285/87 |
| 3,823,965 A * | 7/1974 | Emberson ........... | 285/148.13 |
| 4,610,470 A * | 9/1986 | Perrine et al. ....... | 285/321 |
| 4,691,944 A * | 9/1987 | Viall, Jr. ............ | 285/348 |
| 5,176,121 A | 1/1993 | Kennedy | |
| 5,935,397 A * | 8/1999 | Masterson ........... | 204/298.12 |
| 7,222,889 B2 * | 5/2007 | Breay ............... | 285/354 |
| 7,299,791 B2 * | 11/2007 | Milton .............. | 123/509 |
| 2005/0121908 A1* | 6/2005 | Densel et al. ....... | 285/322 |
| 2007/0267071 A1* | 11/2007 | Milton .............. | 137/565.24 |

\* cited by examiner

*Primary Examiner*—Thomas N Moulis
(74) *Attorney, Agent, or Firm*—Paul L. Marshall

(57) ABSTRACT

An improved O-ring retainer arrangement for retaining an O-ring on a fuel tube of a fuel injector. An overmolded hard plastic ring is disposed on the cylindrical outer surface of the fuel tube. The end of the fuel tube is radially flared to retain the ring on the tube, the radial extent of the flare being less than or equal to the radial thickness of the ring such that the flare cannot come into contact with the bore of a fuel rail socket. The ring is formed such that axial compressive forces exerted on the ring are outside the fuel tube body and preferably are directly opposed, thus exerting no toroidal torque on the ring. The ring is free to move axially on the fuel tube surface. In one aspect of the invention, the ring can move freely along only a limited region on the fuel tube.

11 Claims, 2 Drawing Sheets

O-RING RETAINER FOR A FUEL INJECTOR IN A FUEL RAIL SOCKET

TECHNICAL FIELD

The present invention relates to fuel injectors for internal combustion engines; more particularly, to means for sealing the fuel tube of a fuel injector into a fuel rail socket; and most particularly, to an improved O-ring retainer arrangement wherein the end of the fuel tube is inhibited from damaging either the fuel rail socket surface or a sealing O-ring, and wherein the O-ring retainer has an improved retention force tolerance.

BACKGROUND OF THE INVENTION

In modern internal combustion engines, either gasoline (spark ignited) or diesel (compression ignited), fuel typically is provided to the individual cylinders by individual fuel injectors that draw fuel from a common fuel distributor, known in the art as a fuel rail. Each fuel injector is mated to the fuel rail via an injector socket.

A typical injector socket has a cylindrical inner wall or bore that intersects the fuel rail wall to permit fuel to flow from the fuel rail into the socket. A fuel injector includes a cylindrical fuel tube for insertion into the socket and further includes one or more O-rings disposed on the fuel tube for sealing against fuel leakage between the fuel tube and the socket. The O-ring typically is retained on the fuel tube by a retainer mechanism attached to or formed from the outer end of the fuel tube. During manufacture of the fuel injector, the retainer mechanism is typically formed prior to installation of the O-ring onto the fuel tube; thus, the O-ring must pass over the retainer mechanism to complete the assembly. Further, should the injector be serviced later and the O-ring replaced, the replacement O-ring must again be stretched over the retainer mechanism.

In some prior art arrangements, the retainer is a stamped metal part swaged onto the fuel tube or a radially flared end of the fuel tube itself. Either arrangement typically leaves a rough metal edge on the retainer that can inflict damage on the O-ring during assembly, causing a fuel leak during subsequent use of the injector. Further, if the fuel injector is cocked slightly when entering into the socket, the metal retainer edge can inadvertently score the socket wall, which may cause a fuel leak during injector use. Smoothing of the metal retainer is an added manufacturing cost and cannot fully assure that such damages will not occur. Alternatively, the retainer may be overmolded onto the fuel tube with a softer plastic material to prevent scoring of the socket wall. However, this too adds to the manufacturing costs and raises durability issues as well.

In some other prior art arrangements, an annular groove is formed in the outer wall of the fuel tube and a plastic retainer is either overmolded into the groove or is pressed thereinto. An overmolded or pressed retainer in the groove is subject to breakage due to torsional forces acting on the ring because the axial stress vectors are not directly opposed. Either of these forming and assembly process can add significantly to the manufacturing cost of an injector.

What is needed in the art is an inexpensive, reliable O-ring retainer arrangement for retaining an O-ring on the fuel tube of a fuel injector wherein the arrangement cannot damage the bore of an injector socket and wherein the retainer has superior compressive shock resistance.

It is a principal object of the present invention to prevent damage to an O-ring during installation of the O-ring onto a fuel tube of a fuel injector.

It is a further object of the present invention to prevent damage to a fuel injector socket during assembly of a fuel injector into the socket.

It is a still further object of the present invention to prevent compressive strain of an O-ring retaining means during use.

SUMMARY OF THE INVENTION

Briefly described, an improved O-ring retainer arrangement for retaining an O-ring on a fuel tube of a fuel injector comprises an overmolded hard plastic ring disposed on the cylindrical outer surface of the fuel tube. The end of the fuel tube is radially flared to retain the ring on the tube, the radial extent of the flare being less than or equal to the outer radius of the ring such that the flare cannot come into contact with the bore of a fuel rail socket. The ring is formed such that compressive forces exerted on the ring are outside the fuel tube body and preferably are directly opposed, thus exerting no toroidal torque on the ring. Preferably, the ring is free to move axially on the fuel tube surface.

BRIEF DESCRIPTION OF THE DRAWINGS

The present invention will now be described, by way of example, with reference to the accompanying drawings, in which.

Figure 1:
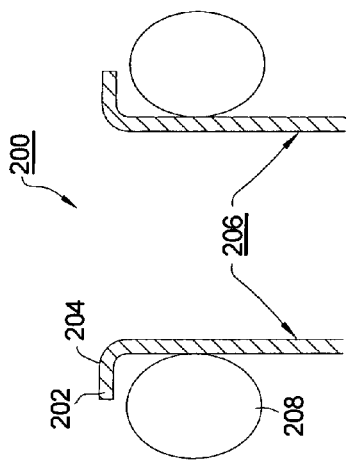
FIG. 1 is a schematic cross-sectional view of a first prior art arrangement for retaining an O-ring on a fuel injector fuel tube.

Corresponding reference characters indicate corresponding parts throughout the several views. The exemplifications set out herein illustrate currently-preferred embodiments of the invention, in several forms, and such exemplifications are not to be construed as limiting the scope of the invention in any manner.

DESCRIPTION OF THE PREFERRED EMBODIMENTS

Referring to FIG. 1, in a first prior art arrangement 100, a stamped metal retaining ring 102 is swaged onto the outer (fuel entrance) end 104 of a fuel tube 106 of a fuel injector 107. An elastomeric O-ring 108 is installed by stretching over end 104 and past retaining ring 102. In use, O-ring 108 seals against both the outer surface 110 of fuel tube 106 and the inner surface 112 of a socket 114 in a fuel supply rail 116. As noted above, a significant hazard in arrangement 100 is a sharp edge 118 on retaining ring 102 which can easily damage O-ring 108 during installation thereof onto fuel tube 106.

Further, because the O-ring is compliant and compressible, edge 118 may inadvertently be engaged with surface 112 during insertion of the fuel injector into the socket, thus damaging surface 112 such that the surface cannot be sealed in use by contact with O-ring 108.

Figure 2:
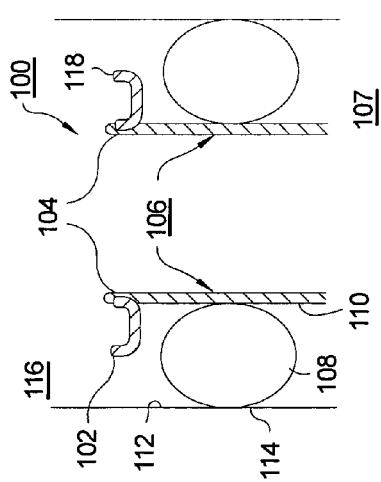
FIG. 2 is a schematic cross-sectional view of a second prior art arrangement for retaining an O-ring on a fuel injector fuel tube.

Referring to FIG. 2, in a second prior art arrangement 200, the outer end 204 of a fuel tube 206 is flared radially to provide a radial retaining flange 202 for O-ring 208. This arrangement suffers from the same problems as arrangement 100.

In the remaining examples, both of the prior art and of the invention, the O-ring is omitted for convenience but should be recognized as being present as shown in FIGS. 1 and 2.

Figure 3:
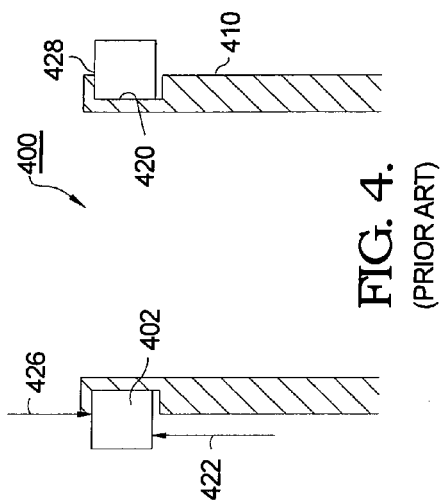
FIG. 3 is a schematic cross-sectional view of a third prior art arrangement for retaining an O-ring on a fuel injector fuel tube.

Referring to FIG. 3, in a third prior art arrangement 300, a groove 320 having an arcuate cross-section is formed in the outer surface 310 of a fuel tube 306. A plastic retaining ring 302 is overmolded onto tube 306, filling groove 320 and extending radially from surface 310 to retain an O-ring on tube 306. A problem is created by extending retaining ring 302 both into groove 320 and radially from surface 310. The O-ring is urged against ring 302 on a vector 322 at a mean location 324 radially off-spaced from surface 310 of tube 306, whereas a resistance vector 326 acts at groove corner 328 on surface 310, thus creating a torque couple which may lead to failure of ring 302 or failure of the joint between ring 302 and fuel tube 306.

Figure 4:
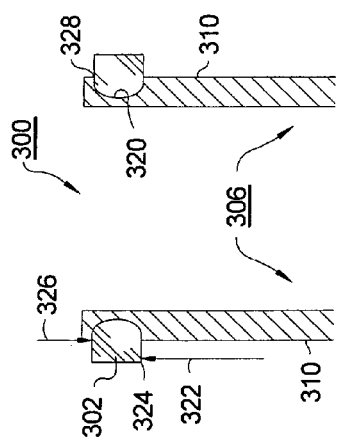
FIG. 4 is a schematic cross-sectional view of a fourth prior art arrangement for retaining an O-ring on a fuel injector fuel tube.

Similarly, referring to FIG. 4, in a fourth prior art embodiment 400, a rectangular groove 420 is machined into outer tube surface 410 and a multi-part plastic ring 402 is pressed into groove 420. As in embodiment 300, a torque couple is formed between first vector 422 and resistance vector 426, which act at differing radial distances and therefore are not directly opposed, resulting in eventual failure of ring 402 at groove corner 428.

Figure 5:
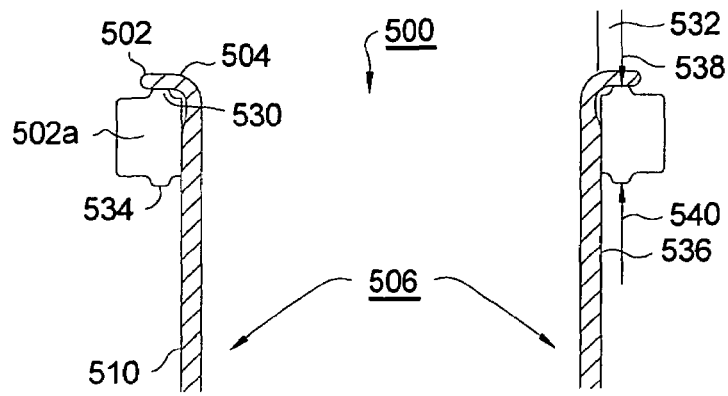
FIG. 5 is a schematic cross-sectional view of a first arrangement in accordance with the invention for retaining an O-ring on a fuel injector fuel tube.

Referring now to FIG. 5, in a first embodiment 500 of an O-ring retainer arrangement in accordance with the invention, the outer end 504 of a fuel injector fuel tube 506 is flared radially outwards defining a radial flange 502, similar to prior art flange 202. However, contrary to prior art arrangement 200, an additional retaining ring 502a is provided on the outer surface 510 of tube 506. Ring 502a is formed of an overmolded, rigid plastic and extends radially beyond the end of flange 502, thus preventing flange 502 from engaging and damaging the wall of the fuel socket during insertion, as can occur in prior art arrangements 100,200. Ring 502a is formed preferably from nylon 6 which is 33% glass filled. Radial flange 502 is formed in the end of fuel tube 506 after retaining ring 502a is installed over the fuel tube. The inside diameter of retaining ring 502a is greater than the outer diameter of the fuel tube allowing the retaining ring to slide freely on the outer surface of the fuel tube. Further, ring 502a includes a first bearing protuberance 530 centered at a first radial distance 532 from wall surface 510 for engaging flange 502, and includes a second bearing protuberance 534 centered at a second radial distance 536 from wall surface 510 for engaging an O-ring; wherein first radial distance 532 and second radial distance 536 are equal. Therefore, no couple is created between vectors 538,540, being directly opposed, and no torsional stress is exerted on ring 502a.

Figure 6:
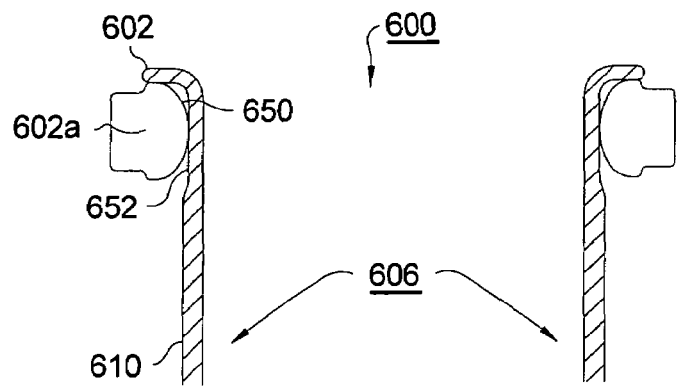
FIG. 6 is a schematic cross-sectional view of a second arrangement in accordance with the invention for retaining an O-ring on a fuel injector fuel tube.

Referring now to FIG. 6, a second embodiment 600 of an O-ring retainer arrangement in accordance with the invention is similar to embodiment 500 except that the inner surface 650 of retaining ring 602a is arcuate and the entire ring is disposed in a region 652 of reduced diameter of fuel tube 606 adjacent radial flange 602. The inside diameter of retaining ring 602a is selected so that the ring slides freely only in region 652.

Figure 7:
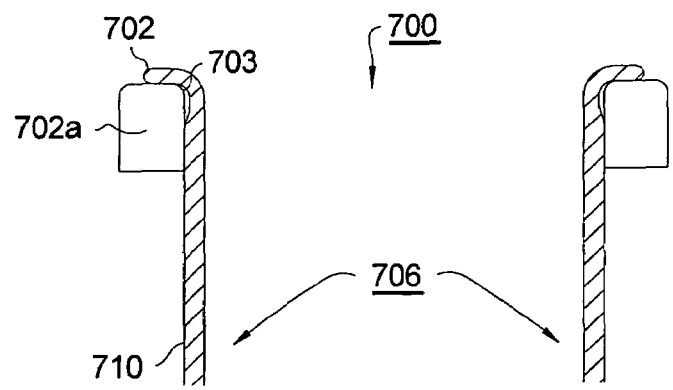
FIG. 7 is a schematic cross-sectional view of a third arrangement in accordance with the invention for retaining an O-ring on a fuel injector fuel tube.

Referring now to FIG. 7, a third embodiment 700 of an O-ring retainer arrangement in accordance with the invention comprises a retaining ring 702a having a generally rectangular cross-sectional shape; preferably inner ring corner 703 is radiused or chamfered to prevent contact and force accumulation at this point. As in embodiment 500, and again unlike the prior art arrangements, the entire ring 702a is formed outside the cylindrical extension of surface 710 of fuel tube 706, thus allowing the compressive forces on the ring, as discussed previously in respect of embodiment 500, to be opposed and therefore to create no toroidal stress on the retaining ring. As in embodiment 500, the inner diameter of retaining ring 702a is greater than the outer diameter of the associated fuel tube, allowing the retaining ring to slide freely on the outer surface of the fuel tube.

In summary, the improved O-ring retaining arrangements 500,600,700 disclosed herein are improvements over prior art arrangements 100,200,300,400 in immunity from damaging fuel socket walls, and immunity from damaging an O-ring during installation thereof onto the fuel tube.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An arrangement for retaining an O-ring on the outer surface of a fuel tube of a fuel injector, comprising:
    a) a flange extending radially from said outer surface; and
    b) a rigid retaining ring disposed on said outer surface for engagement with said flange and for spacing said O-ring from said flange,
    wherein an outer radius of said retaining ring is at least equal to a radius of said flange, and
    wherein axial compression vectors acting on said retaining ring are outside said outer surface of said fuel tube.

2. An arrangement in accordance with claim 1 wherein said axial compression vectors are directly opposed.

3. An arrangement in accordance with claim 1 wherein said rigid retaining ring is slidably disposed on said fuel tube.

4. An arrangement in accordance with claim 1 wherein said outer radius of said retaining ring is greater than said radius of said flange.

5. An arrangement in accordance with claim 1 wherein an inner radius of said retaining ring is greater than an outer radius of said fuel tube.

6. An arrangement in accordance with claim 1 wherein an inner corner of said retaining ring is radiused or chamfered.

7. An arrangement in accordance with claim 1 wherein said retaining ring is formed from a filled organic polymer.

8. An arrangement in accordance with claim 7 wherein said filled organic polymer is glass-filled nylon.

9. An arrangement in accordance with claim 1 wherein said rigid retaining ring is slidably disposed within a limited region on said fuel tube.

10. A fuel injector comprising an arrangement for retaining an O-ring on the outer surface of a fuel tube of said fuel injector,
    wherein said arrangement includes a flange extending radially from said outer surface, and a rigid retaining ring disposed on said outer surface for engagement with said flange and for spacing said O-ring from said flange,
    wherein an outer radius of said retaining ring is at least equal to a radius of said flange, and wherein axial compression vectors acting on said retaining ring are outside said outer surface of said fuel tube.

11. An arrangement for sealing a fuel tube of a fuel injector in an injector socket of a fuel rail, comprising:
   a) a flange extending radially from an outer surface of said fuel tube;
   b) a rigid retaining ring disposed on said outer surface for engagement with said flange; and
   c) an O-ring disposed on said outer surface adjacent said retaining ring for sealing against said outer surface and said injector socket, wherein an outer radius of said retaining ring is at least equal to a radius of said flange, and wherein axial compression vectors acting on said retaining ring are outside said outer surface of said fuel tube.

* * * * *